United States Patent
Dubois et al.

(10) Patent No.: US 6,343,007 B1
(45) Date of Patent: Jan. 29, 2002

(54) SYSTEM AND METHOD FOR PROVIDING SYSTEM FUNCTIONS IN A TELECOMMUNICATIONS NETWORK

(75) Inventors: Gerald R. Dubois, Lucas; Serge F. Fourcand, Fairview; Eddie R. Bradley, Richardson, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/541,389

(22) Filed: Mar. 31, 2000

(51) Int. Cl.[7] .............................................. H01R 23/68
(52) U.S. Cl. ...................... 361/683; 361/785; 361/791; 439/61; 312/223.2
(58) Field of Search ........................ 361/683, 690–695, 361/726–728, 785, 791, 795–797, 803, 752, 801, 732–733, 602–625, 627, 641–645, 678, 826–827; 439/61, 62, 64, 377, 378, 354; 312/223.1, 223.2, 223.6; 211/41, 26; 370/375–376, 357–360, 377, 378, 381, 379, 380, 538, 539, 364, 438

(56) References Cited

U.S. PATENT DOCUMENTS

| | | | | |
|---|---|---|---|---|
| 5,010,450 A | * | 4/1991 | Werdin et al. ............... | 361/415 |
| 5,398,161 A | * | 3/1995 | Roy ............................ | 361/727 |
| 5,488,541 A | * | 1/1996 | Mistry et al. ................ | 361/788 |
| 5,546,282 A | * | 8/1996 | Hill et al. .................... | 361/796 |
| 5,666,271 A | * | 9/1997 | Kim et al. .................... | 361/726 |
| 5,781,410 A | * | 7/1998 | Keown et al. ............... | 361/690 |
| 5,848,065 A | * | 12/1998 | Gorshe et al. .............. | 370/376 |
| 5,912,801 A | * | 6/1999 | Roy et al. .................... | 361/690 |
| 5,999,403 A | * | 12/1999 | Neustadt ...................... | 361/695 |

FOREIGN PATENT DOCUMENTS

| | | | | | |
|---|---|---|---|---|---|
| DE | 331361 A | * | 4/1983 | ............ | H04Q/1/02 |
| GB | 2124432 A | * | 2/1984 | ............ | H05K/5/02 |
| WO | WO-91/15086 | * | 3/1990 | ............ | H04Q/1/14 |

* cited by examiner

Primary Examiner—Leo P. Picard
Assistant Examiner—Michael Datskovsky
(74) Attorney, Agent, or Firm—Baker Botts L.L.P.

(57) ABSTRACT

A telecommunications shelf is disclosed that includes a back portion of a shelf, a bus control transition module, and a back plane. The back portion of the shelf is operable to receive a plurality of transition modules. The bus control transition module is received in the back portion of the shelf. The back plane is coupled to the bus control transition module. The bus control transition module is operable to provide system functions for a plurality of cards in the shelf over the back plane.

12 Claims, 2 Drawing Sheets

SYSTEM AND METHOD FOR PROVIDING SYSTEM FUNCTIONS IN A TELECOMMUNICATIONS NETWORK

TECHNICAL FIELD OF THE INVENTION

This invention relates generally to the field of telecommunications and more specifically to a system and method for providing system functions in a telecommunications network.

BACKGROUND OF THE INVENTION

In the telecommunications industry, competitive long distance exchange carriers are increasingly providing telecommunication services to greater numbers of customers. Generally, these carriers use racks that include different types of cards for performing the functions necessary to provide these services. The racks are typically located on property owned by larger telecommunications providers.

Because the amount of available rack space is limited, the larger telecommunications providers generally charge each competitive long distance exchange carrier for use of the space based on the amount of area required by the racks for that carrier. Conventional racks are approximately forty to forty-two inches wide and require additional space for running cabling for the components of the racks, resulting in relatively large space requirements for the racks and correspondingly high costs for the carriers.

Additionally, conventional racks include shelves that are divided into half shelves. These half shelves typically include eight slots for receiving the cards that perform the necessary functions. In conventional racks, each half shelf requires the use of one slot for a system card to provide the system functions. Thus, only the remaining seven slots are available for peripheral cards.

SUMMARY OF THE INVENTION

In accordance with the present invention, a system and method for providing system functions in a telecommunications network are provided that substantially eliminate or reduce the disadvantages and problems associated with previously developed systems and methods. In particular, space requirements are reduced, while additional slots are made available for peripheral cards.

According to one embodiment of the present invention, a telecommunications shelf is disclosed that includes a back portion of a shelf, a bus control transition module, and a back plane. The back portion of the shelf is operable to receive a plurality of transition modules. The bus control transition module is received in the back portion of the shelf. The back plane is coupled to the bus control transition module. The bus control transition module is operable to provide system functions for a plurality of cards in the shelf over the back plane.

Technical advantages of the present invention include an improved system for providing system functions in a telecommunications network. In particular, system functions are provided by a bus control transition module in a back portion of a half shelf. As a result, a system card is not required to perform the system functions, although jumpers for the bus control transition module also allow the rack to function in the presence of a system card. Accordingly, an additional slot which is generally reserved for a system card is made available for a peripheral card.

Another technical advantage includes reduced space requirements for the rack. In particular, the peripheral cards are approximately six inches deep, the transition modules are approximately three inches deep, and the rack is approximately nineteen inches wide. As a result, the space required for implementing the rack itself is reduced, and space is also available within the rack for cabling which results in additional space reductions for the rack system. Accordingly, costs associated with space requirements for the rack system are reduced.

Other technical advantages of the present invention will be readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
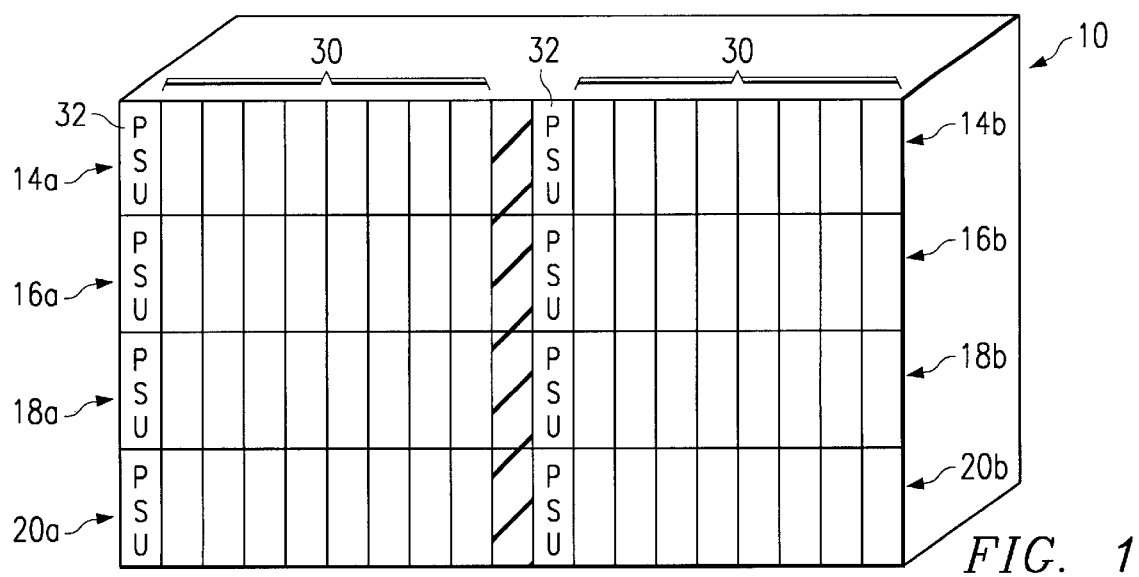
FIG. 1 is a block diagram illustrating a rack for use in a rack system of a telecommunications network in accordance with one embodiment of the present invention.

FIG. 1 is a block diagram illustrating a rack 10 for use in a rack system of a telecommunications network in accordance with one embodiment of the present invention. The rack system comprises one or more racks 10 that are each able to house at least a portion of the equipment used in the telecommunications network. Each rack 10 is approximately nineteen inches wide and comprises a plurality of shelves 14, 16, 18 and 20. Although the illustrated embodiment includes four shelves, it will be understood that any suitable number of shelves may be included without departing from the scope of the present invention.

According to an exemplary embodiment, each shelf 14, 16, 18 and 20 comprises two redundant half shelves 14a–b, 16a–b, 18a–b and 20a–b. Components in the half shelves 14a, 16a, 18a and 20a have corresponding components in the half shelves 14b, 16b, 18b and 20b. In operation, one component is in an active mode while the corresponding component is in an inactive, standby mode. If one or more active components fail, the corresponding redundant components enter the active mode to perform the functions of the failed components.

Each shelf 14, 16, 18 and 20 comprises card slots operable to house one or more cards 30. The cards 30 comprise hardware, software and/or firmware for implementing one or more functions of the rack system. In the exemplary embodiment, each shelf 14, 16, 18 and 20 comprises sixteen card slots for receiving up to sixteen cards 30 and two power supply units (PSUs) 32, with eight card slots and one PSU 32 in each half shelf 14a, 14b, 16a, 16b, 18a, 18b, 20a and 20b. The shelves 14, 16, 18 and 20 also provide access to a back plane (not shown in FIG. 1) that facilitates communication between the cards 30 and the rack system.

Each shelf 14, 16, 18 and 20 may house different types of cards 30. According to one embodiment, the rack 10 may be a basic rack 10 or an extended rack 10. For this embodiment, in a basic rack 10, shelf 14 houses cards 30 that implement administration functions of the rack system, shelf 16 houses cards 30 that implement operations and maintenance functions of the rack system, and shelves 18 and 20 house cards 30 that implement linking functions of the rack system. In an extended rack 10, each shelf 14, 16, 18 and 20 houses cards 30 that implement linking functions of the rack system.

Figure 2:
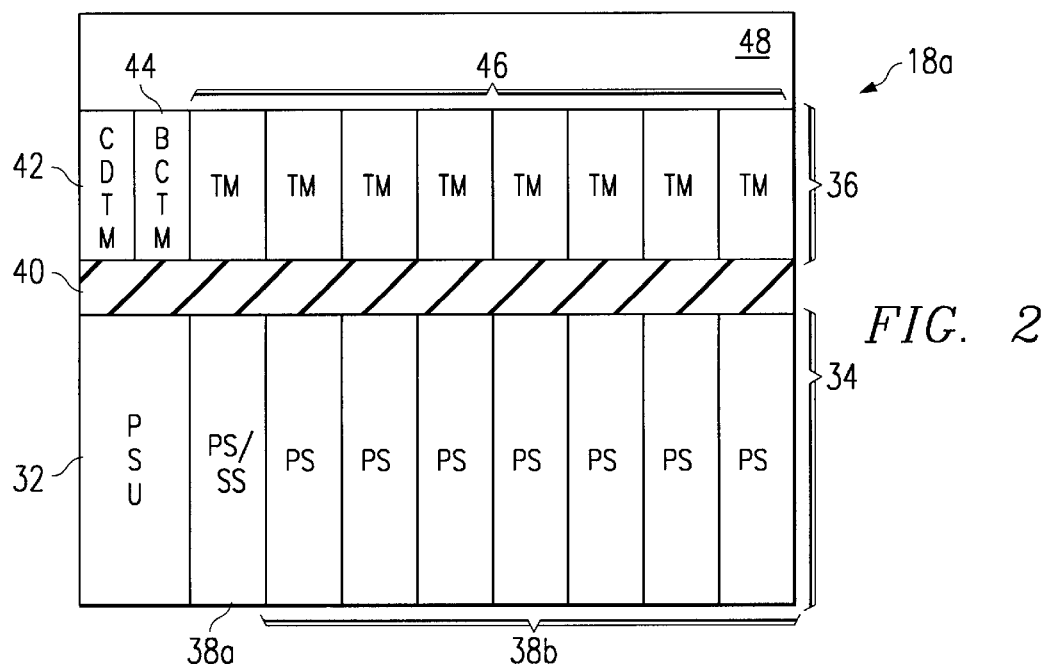
FIG. 2 is a block diagram illustrating a top-down view of one of the half shelves in the rack of FIG. 1 in accordance with one embodiment of the present invention.

FIG. 2 is a block diagram illustrating a top-down view of the half shelf 18a in accordance with one embodiment of the present invention. Although the half shelf illustrated is designated as half shelf 18a, it will be understood that the half shelf described in connection with FIG. 2 may be any one of the half shelves 14a, 14b, 16a, 16b, 18a, 18b, 20a or 20b of the rack 10.

The half shelf 18a comprises a front portion 34, a back portion 36, and a back plane 40. The front portion 34 comprises a PSU 32 and a plurality of slots 38 for receiving cards 30. According to one embodiment, the cards 30 received in the slots 38 of the front portion 34 are approximately six inches deep. A first slot 38a may comprise a peripheral/system slot, while the remaining slots 38b comprise peripheral slots. The peripheral/system slot 38a may receive either a peripheral card 30 or a system card 30, and the peripheral slots 38b may receive peripheral cards 30. A system card 30 performs system functions such as arbitration, clock distribution, reset functions and the like, while a peripheral card 30, which may comprise a simple board, an intelligent slave, a peripheral component interface (PCI) bus master, or the like, performs peripheral functions.

The PSU 32 and the slots 38 are coupled to the back plane 40 which may support up to 600 Watts of power consumption, exclusive of power supply usage. The back plane 40 comprises one or more buses for providing communication between the cards 30 and other components of the rack system. The back plane 40 for each half shelf 14a, 16a, 18a and 20a is independent of the back plane 40 for the corresponding half shelf 14b, 16b, 18b and 20b, allowing each to be replaced without affecting the operation of the other.

The back portion 36 comprises a compact PCI distribution transition module (CDTM) 42, a bus control transition module (BCTM) 44, and a plurality of transition module slots for receiving other suitable transition modules 46. According to one embodiment, the transition modules 42, 44 and 46 received in the back portion 36 are approximately three inches deep.

The CDTM 42 receives a clock signal and a message signal including a plurality of messages from a compact system timing generator (CSTG) and sends these signals to the BCTM 44. The CDTM 42 also receives a reference clock signal and a status signal from the BCTM 44 and transmits these signals to the CSTG.

The transition modules 46 terminate customer data interfaces. Thus, for example, the transition modules 46 may include an Application Node Digital Signal Zero A transition module (ANDTM), a T1/E1 transition module (TETM), or any other suitable transition module. An ANDTM provides a physical interface between a compact PCI computing element and a digital signal zero A (DSOA) function and also provides connectorization for a mate link function and dual 10/100 Base Tx Ethernet interfaces. A TETM provides a physical interface between two individual T1 or E1 links and a signaling link computing element and also provides connectorization for a mate link function and dual 10/100 Base Tx Ethernet interfaces. For each card 30 inserted into a card slot 38, a corresponding transition module 46 is inserted into a transition module slot opposite the card 30 to provide communication between the card 30 and other components external to the half shelf 18a.

The BCTM 44 receives a clock signal and a message signal from the CDTM 44 and from a CDTM for the corresponding half shelf 18b. The BCTM 44 aligns the signals, selects the highest quality signal for each using a selector, and distributes the selected signals to the cards 30 in the slots 38 of the half shelf 18a. In addition, the BCTM 44 receives a reference signal and a status signal from each of the cards 30 in the slots 38. The BCTM 44 monitors the status of the cards 30 based on the status signals and generates an output status signal for transmission to the CDTM 44. The BCTM 44 also selects the highest quality reference clock signal from the cards 30 and sends the selected signal to the CDTM 44.

The BCTM 44 is capable of performing the functions generally provided by a system card 30 inserted into the peripheral/system slot 38a when no such card 30 is present in the slot 38a. Thus, for example, the BCTM 44 is able to provide bus arbitration, clock sourcing, reset functions, and basic hot swap control and monitoring of certain signals for the half shelf 18a in the absence of a system card 30. In order to enable the BCTM 44 to provide these functions, the back plane 40 is extended past the transition modules 46 such that the BCTM 44 may access the back plane 40. According to the embodiment illustrated in FIG. 2, the back plane 40 is also extended past the BCTM 44 to allow the CDTM 42 to access the back plane 40.

The half shelf 18a also comprises a cable region 48 behind the back portion 36. The cable regions 48 for all the half shelves 14a–b, 16a–b, 18a–b and 20a–b comprise a space within the rack 10 through which cabling may be run for the components of the rack 10. This reduces space requirements for the rack system by eliminating the need to provide additional space external to the rack 10 for the cables.

Figure 3:
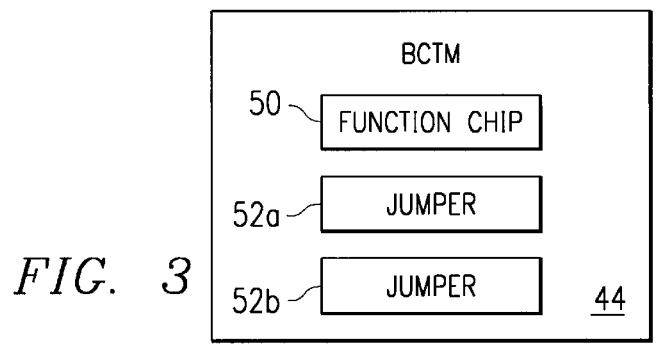
FIG. 3 is a block diagram illustrating one embodiment of the bus control transition module of FIG. 2.

FIG. 3 is a block diagram illustrating one embodiment of the BCTM 44. The BCTM 44 includes a function chip 50 for providing the system functions in the absence of a system card 30, as described above in connection with FIG. 2. The function chip 50 may be implemented in hardware, software and/or firmware, or any suitable combination thereof.

According to one embodiment, the BCTM 44 also comprises a plurality of jumpers 52a–b for enabling or disabling the system functions provided by the function chip 50. Thus, for example, if a system card 30 is present in the peripheral/system slot 38a, one or more jumpers 52a and/or 52b may be utilized to disable the functions in the function chip 50 that are provided by the system card 30. In accordance with one embodiment, a separate jumper 52a or 52b is provided for each system function in the function chip 50. Thus, each system function may be individually enabled or disabled through the use of a corresponding jumper 52a or 52b in accordance with the functionality of an available system card 30. Alternatively, each of one or more jumpers 52a and/or 52b may enable or disable a plurality of functions provided by the function chip 50. Thus, although the illustrated embodiment includes two jumpers 52a and 52b, it will be understood that any suitable number of jumpers may be included in the BCTM 44 without departing from the scope of the present invention.

Figure 4:
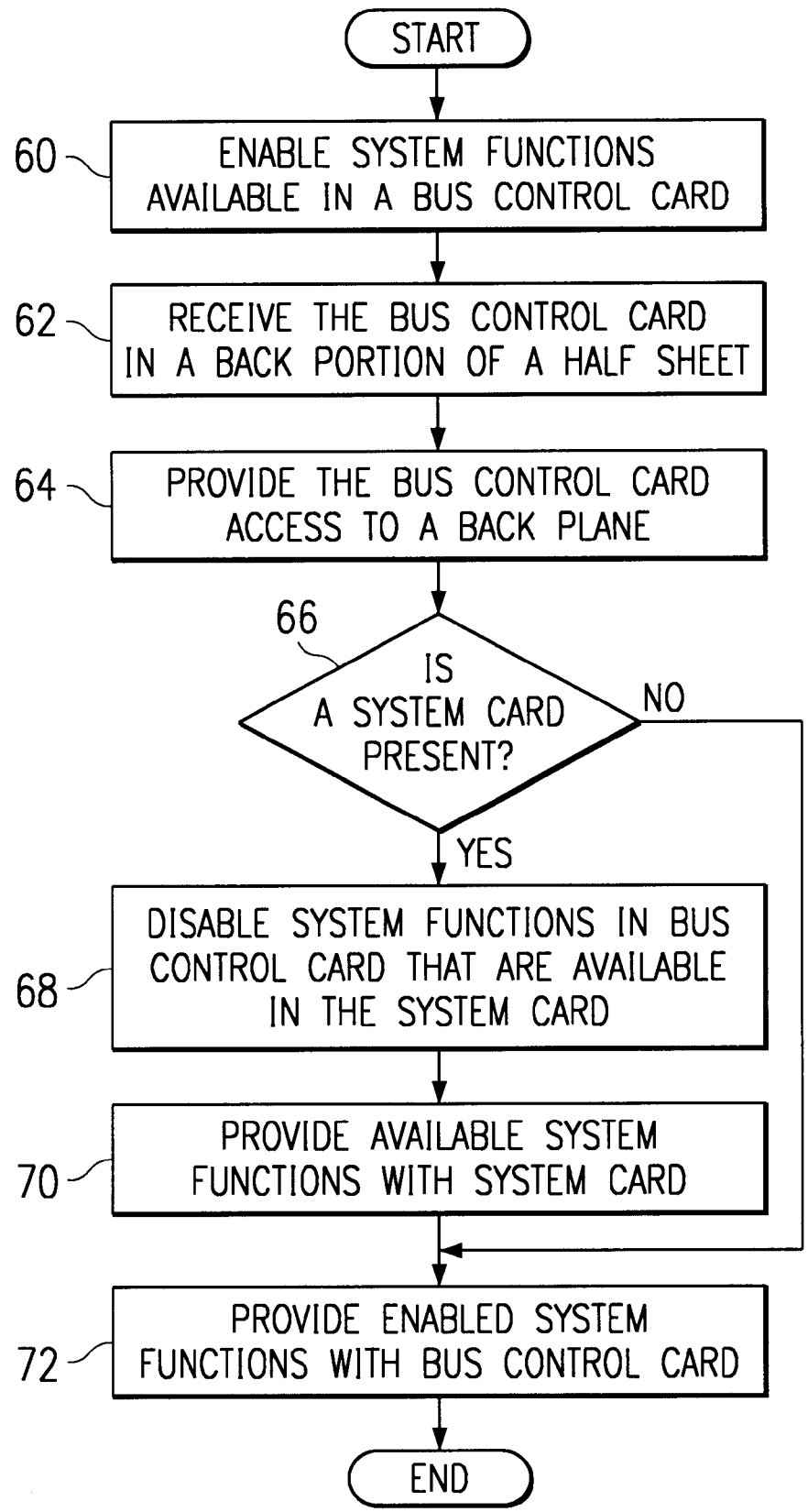
FIG. 4 is a flow diagram illustrating a method for providing system functions in a telecommunications network in accordance with the teachings of the present invention.

FIG. 4 is a flow diagram illustrating a method for providing system functions in a telecommunications network in accordance with the teachings of the present invention. The method begins at step 60 where system functions available in a bus control card, such as a BCTM 44, are enabled. In step 62, the bus, control card is received in the back portion 36 of a half shelf 18a. In step 64, the bus control card is provided access to the back plane 40 for providing system functions.

In decisional step 66, a determination is made as to whether a system card 30 is present in the peripheral/system slot 38a. If a system card 30 is present in the peripheral/system slot 38a, the method follows the Yes branch from decisional step 66 to step 68 where the system functions in the bus control card that are available in the system card 30 are disabled. In step 70, the system card 30 provides the available system functions for the back plane 40. In step 72, the bus control card provides the remaining. enabled system functions, if any, for the back plane 40.

Returning to decisional step 66, if a system card 30 is not present in the peripheral/system slot 38a, the method follows the No branch from decisional step 66 to step 72 where the bus control card provides the enabled system functions for the back plane 40.

Although the present invention has been described with several embodiments, various changes and modifications may be suggested to one skilled in the art. It is intended that the present invention encompass such changes and modifications as fall within the scope of the appended claims.

What is claimed is:

1. A telecommunications shelf, comprising:
   a back portion of the shelf operable to receive a plurality of transition modules;
   a bus control transition module received in the back portion of the shelf; and
   a back plane coupled to the bus control transition module, the bus control transition module operable to provide system functions for a plurality of cards in the shelf over the back plane;
   a cable region of the shelf coupled to the back portion of the shelf, the cable region operable to pass through cabling for the shelf.

2. A telecommunications shelf, comprising:
   a back portion of the shelf operable to receive a plurality of transition modules;
   a bus control transition module received in the back portion of the shelf; and
   a back plane coupled to the bus control transition module, the bus control transition module operable to provide system functions for a plurality of cards in the shelf over the back plane;
   a front portion of the shelf operable to receive the plurality of cards, the front portion of the shelf coupled to the back plane;
   wherein the bus control transition module includes at least one jumper operable to enable and disable the system functions provided by the bus control transition module.

3. The shelf of claim 2, further comprising a system card received in the front portion of the shelf, the system card operable to provide specified system functions for the back plane, the jumper operable to disable the specified system functions provided by the bus control transition module.

4. The shelf of claim 5, the front portion operable to receive eight peripheral cards.

5. A telecommunications shelf, comprising:
   a front portion comprising a plurality of slots;
   a back plane coupled to the front portion;
   a back portion comprising a plurality of slots; and
   a cable region coupled to the back portion, the cable region operable to pass through cabling for the shelf.

6. The shelf of claim 5, each of the plurality of slots for the front portion operable to receive a card and each of the plurality of slots for the back portion operable to receive a transition module.

7. The shelf of claim 6, each card approximately six inches deep and each transition module approximately three inches deep.

8. The shelf of claim 6, each slot for the front portion corresponding to a slot for the back portion such that, for each card received in a slot for the front portion, a transition module is received in the corresponding slot for the back portion.

9. The shelf of claim 6, the front portion further comprising a power supply unit, a bus control transition module received in a slot for the back portion, the bus control transition module operable to provide system functions for the cards received in the slots for the front portion over the back plane.

10. The shelf of claim 5, the front portion comprising eight slots each operable to receive a peripheral card.

11. A system for providing system functions in a telecommunications network, comprising:
    a rack comprising a plurality of half shelves, each half shelf comprising a back plane and a back portion, the back portion operable to receive a plurality of transition modules; and
    a bus control transition module received in the back portion and coupled to the back plane, the bus control transition module operable to provide system functions for a plurality of cards in the half-shelf over the back plane;
    wherein each half shelf further includes a front portion operable to receive the plurality of cards, the front portion coupled to the back plane;
    wherein the bus control transition module includes at least one jumper operable to enable and disable the system functions provided by the bus control transition module.

12. The system of claim 11, further comprising a system card received in the front portion, the system card operable to provide specified system function for the back plane, the jumper operable to disable the specified system functions provided by the bus control transition module.

* * * * *